US007409512B1

(12) United States Patent
Kekre et al.

(10) Patent No.: US 7,409,512 B1
(45) Date of Patent: Aug. 5, 2008

(54) METHOD AND APPARATUS FOR MAINTAINING INFORMATION THAT INDICATES VALID REGIONS OF A WORKING VOLUME AND USING THAT INFORMATION TO DELAY VOLUME INITIALIZATION

(75) Inventors: Anand A. Kekre, Baner (IN); John A. Colgrove, Los Altos, CA (US); Oleg Kiselev, Palo Alto, CA (US); Ronald S. Karr, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 420 days.

(21) Appl. No.: 10/882,612

(22) Filed: Jul. 1, 2004

(51) Int. Cl.
*G06F 12/16* (2006.01)

(52) U.S. Cl. ........................ 711/161; 711/114; 707/201

(58) Field of Classification Search ................ 711/114, 711/161; 707/201
See application file for complete search history.

(56) References Cited

U.S. PATENT DOCUMENTS 5,390,327 A * 2/1995 Lubbers et al. ................ 714/7
5,590,276 A 12/1996 Andrews ........................ 714/6
5,928,367 A 7/1999 Nelson et al. .................. 714/6
6,725,392 B1 4/2004 Frey et al. ...................... 714/6
6,785,789 B1 8/2004 Kekre et al. ................. 711/162
6,912,631 B1 6/2005 Kekre et al. ................. 711/162
6,996,687 B1 * 2/2006 Kekre et al. ................. 711/162
7,032,089 B1 4/2006 Ranade et al. .............. 711/161
7,206,863 B1 4/2007 Oliveira et al. .............. 709/245
2003/0159007 A1 * 8/2003 Sawdon et al. .............. 711/154
2003/0212660 A1 11/2003 Kerwin .......................... 707/1
2003/0236944 A1 * 12/2003 Thompson et al. .......... 711/114
2004/0039890 A1 * 2/2004 Itoh et al. ................... 711/162
2004/0123031 A1 * 6/2004 Kiselev et al. .............. 711/114

OTHER PUBLICATIONS

ECC Technologies Inc., ECC FAQs, 2001, retrieved from internet Apr. 27, 2007 <http://members.aol.com/mnecctek/faqs.html>.*
The PC Guide, RAID Levels 1+5 (15) and 5+1 (51), Apr. 17, 2001, retrieved from internet Apr. 27, 2007 <http://www.pcguide.com/ref/hdd/perf/raid/levels/multLevel15-c.html>.*

(Continued)

*Primary Examiner*—Donald Sparks
*Assistant Examiner*—Jared I Rutz
(74) *Attorney, Agent, or Firm*—Campbell Stephenson LLP; Brenna A. Brock

(57) ABSTRACT

Various embodiments of systems and methods are disclosed for tracking valid regions of a working volume. State information identifies which regions of the working volume are currently valid. When the volume is created, the state information can be initialized to a value that identifies all regions of the volume as being invalid. The invalid regions do not need to be synchronized, since there will not be any need to reconstruct the data within those regions to a particular value. Accordingly, volume initialization, which synchronizes redundant data (e.g., RAID parity or a mirrored copy) with application data in the invalid regions, can be delayed. As the volume is accessed by an application, the redundant data associated with the regions being accessed is synchronized, and the state information is updated to indicate that those regions are valid.

23 Claims, 8 Drawing Sheets

OTHER PUBLICATIONS

Kekre, Anand A., et al., pending U.S. Patent Application entitled "Method and Apparatus for Restoring a Corrupted Data Volume," U.S. Appl. No. 10/254,753, filed Sep. 25, 2002, including Specification: pp. 1-26; Drawings: Figures 1-10 on 7 sheets.

Colgrove, John A., et al., pending U.S. Patent Application entitled "Volume Restoration Using an Accumulator Map," U.S. Appl. No. 10/324,811, filed Dec. 20, 2002, including Specification: pp. 1-21; Drawings: Figures 1-21 on 14 sheets.

Kekre, Anand A., et al., pending U.S. Patent Application entitled "Method and Apparatus for Synchronizing Redundant Data With A Volume," U.S. Appl. No. 10/882,631, filed Jul. 1, 2004, including Specification: pp. 1-40; Drawings: Figures 1-11 on 13 sheets.

* cited by examiner (Case 1: Mirrored Volume)

(Case 2: Mirrored volume that is initially zeroed)

(Case 3: RAID 5 volume)

(Case 4: RAID 5 volume that is initially zeroed)

METHOD AND APPARATUS FOR MAINTAINING INFORMATION THAT INDICATES VALID REGIONS OF A WORKING VOLUME AND USING THAT INFORMATION TO DELAY VOLUME INITIALIZATION

FIELD OF THE INVENTION

This invention relates to data processing systems and, more particularly, to data processing systems that use redundancy techniques, such as mirroring or data parity, to protect application data.

BACKGROUND

Applications access data that is stored on a persistent storage device, such as a disk drive or an array of disk drives. Redundant data is often maintained in order to provide improved availability and/or performance. For example, multiple identical copies (also called mirrors or plexes) of the same data are often maintained. While multiple copies of the data are available, an application's accesses to the data can be interleaved across multiple copies, providing increased access performance. If one copy of the data is corrupted, an application can continue to access the data in one of the other copies. As another example, parity information can be calculated for selected subsets of the data. If a subset of the data is corrupted, the remaining data is used, in conjunction with the parity information, to reconstruct the corrupted data.

A number of Redundant Array of Independent Disk (RAID) levels have been defined, each offering a unique set of performance and data-protection characteristics. RAID techniques are implemented on both physical storage devices and logical storage devices (referred to herein as volumes). Most RAID levels, such as RAID 1-6, maintain redundant data, either in the form of mirrors or parity. For example, RAID 1 provides one or more mirrored copies. Among the RAID configurations that use parity, RAID 2 uses a complex Hamming code calculation to generate the parity data, and consequentially RAID 2 is not typically found in commercial implementations. RAID levels 3, 4 and 5 are, by contrast, often implemented. Each of RAID levels 3, 4, and 5 uses an exclusive-or (XOR) calculation to generate parity data. RAID 3 distributes bytes across multiple disks and calculates parity from related groups (referred to as stripes) of bytes. RAID 4 and RAID 5 arrays compute parity on an application-specific block size, called an interleave or stripe unit, which is a fixed-size data region that is accessed contiguously. All stripe units in the same stripe (i.e., all stripe units at the same depth or altitude on each drive) are used to compute the parity. RAID 4 stores parity on a single disk in the array, while RAID 5 removes a possible bottleneck on the parity drive by rotating parity across all drives in the set.

In order for redundant data to provide protection against the failure of original data, when the redundant data is created, the redundant data must be synchronized with the application data. In the situation in which an application can access any one of several mirrors, it is also important that the data stored in the mirrors be synchronized in such a way that a read request can be satisfied from any one of the mirrors. Consistency between mirrors is maintained by having write operations write data to all mirrors (usually concurrently), and only allowing the write operation to complete when all of the mirrors have been updated with the new data.

Redundant data must be synchronized with the original data in a volume, even if some regions of the volume have never been written by the application. For a mirrored volume, this synchronization can be provided by copying the content of one mirror to the rest of the mirrors when the mirrored volume is created or when a new mirror is added to the volume. For a volume that includes parity, the synchronization process involves computing one or more parity values from the application data within the volume. This synchronization process puts a heavy I/O load on the system, since both reading and writing of the volume are involved. If parity has to be calculated, additional CPU and memory resources are consumed as well. Another option for volume initialization involves initializing the volume by writing all zeros to the entire volume. While this option is less I/O intensive (because volume contents are not read), the entire volume must still be written. Accordingly, techniques are desired to reduce the amount of computing resources and effort needed to initialize a volume that includes redundant data.

SUMMARY OF THE INVENTION

Various embodiments of systems and methods are disclosed for tracking valid regions of a working volume. State information identifies which regions of the working volume are currently valid. When the volume is created, the state information can be initialized to a value that identifies all regions of the volume as being invalid. The invalid regions do not need to be synchronized, since there will not be any need to reconstruct the data within those regions to a particular value. Accordingly, the synchronization of redundant data with application data in the invalid regions can be delayed. As the volume is accessed by an application, the redundant data associated with the regions being accessed is synchronized, and the state information is updated to indicate that those regions are valid.

In one embodiment, a method involves maintaining state information. The state information is associated with regions of a working volume, and indicates which of the regions of the working volume are valid. Maintaining the state information involves updating the state information in response to the working volume being accessed. The state information is initialized to a value (e.g., by an application). The value indicates whether each region of the working volume is valid (e.g., the value indicates that a region of the working volume is valid if the application has valid data in that region).

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

Figure 1:
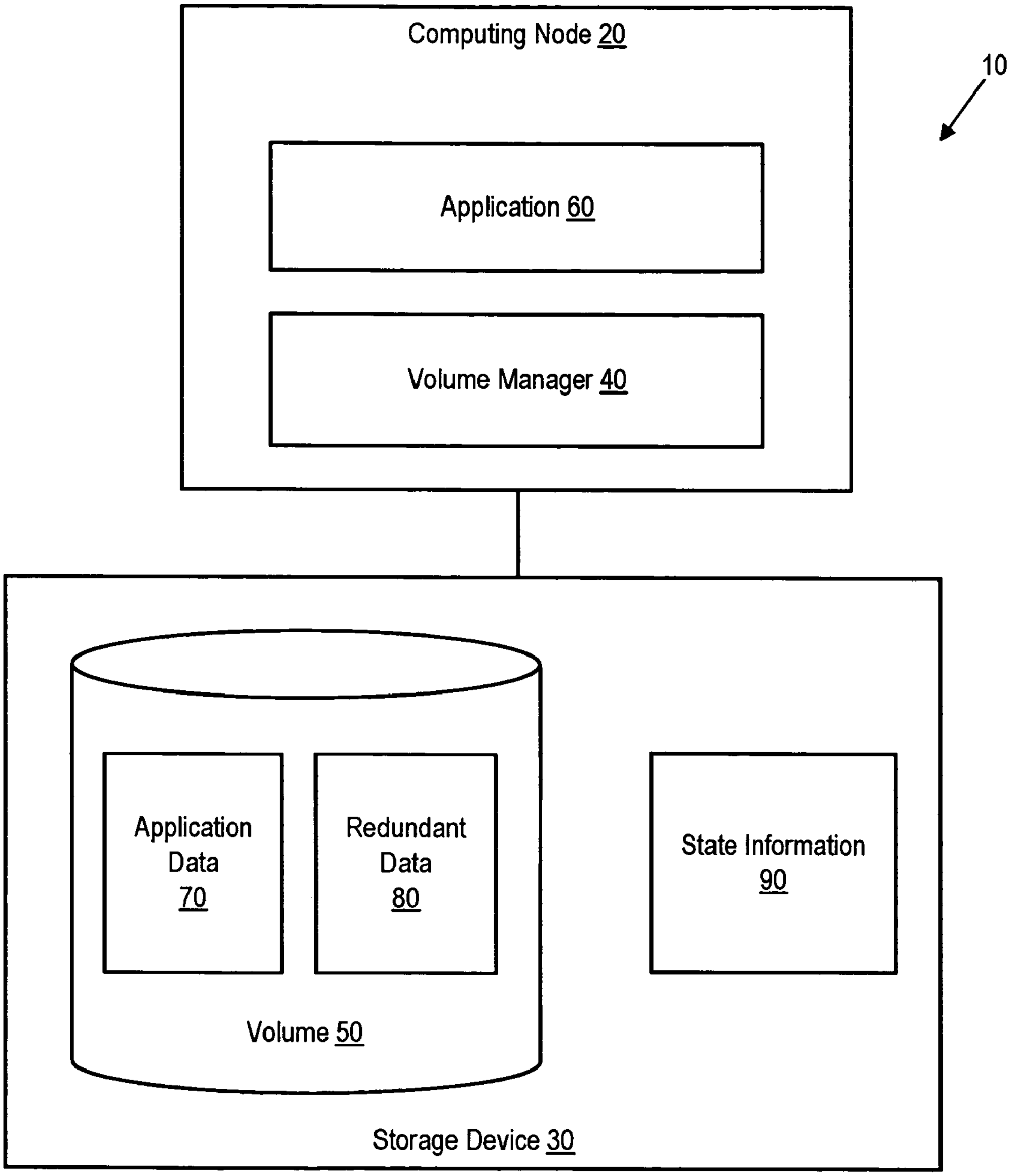
FIG. 1 shows a data processing system that includes a mechanism for tracking the state of each region of a working volume, according to one embodiment of the present invention

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

State information associated with a working volume is used to track the valid data on the working volume. For example, the state information can be maintained in a bitmap that includes (at least) one bit for each region of a working volume. The value of each bit indicates whether a respective region currently stores valid data. Similarly, the state information can be maintained in an extent map that includes a list of extents, which specifies the starting offset and ending offset (or starting offset and length), as well as whether the specified extent currently stores valid data, for each of the extents. Whenever the state information identifies a particular region as storing valid data, the redundant data included in and/or associated with the application data in that region is guaranteed to be synchronized with the application data. By keeping track of the valid data on the working volume, initial synchronization of the supplemental data in the working volume can be avoided. For example, if the working volume includes two or more mirrors, these mirrors do not need to be initially synchronized with each other. Similarly, if the working volume is implemented as a RAID 5 volume, initial parity calculation for the working volume can be avoided.

FIG. 1 shows a block diagram of a data processing system. In this example, data processing system 10 includes computing node 20 and storage device 30. Computing node 20 is a computing device, such as a server, workstation, personal computer, personal digital assistant (PDA), laptop computer, cell phone, network switch, storage device controller, storage appliance, storage switch, or the like.

Storage device 30 represents one or more physical storage devices. A physical storage device can be a single device (e.g., a single hard drive, CD (Compact Disc) drive, or DVD (Digital Versatile Disc) drive). Alternatively, a storage device may include several such devices (e.g., storage device 30 can be a RAID array of several hard drives controlled by a hardware array controller).

Computing node 20 implements volume manager 40. Volume manager 40 is a storage virtualization component such as VERITAS Volume Manager™. A virtualization component, which can be implemented in hardware, software, or a combination of the two, creates and manages one or more logical storage devices, called volumes, such as volume 50. The virtualization component can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

In this example, computing node 20 also implements application 60 (e.g., a file system or database), which accesses data in volume 50 by sending volume manager 40 read and/or write requests to perform corresponding read and/or write operations to the volume. Volume manager 40 then performs the requested read and/or write operations (e.g., by performing one or more read and/or write accesses to volume 50). Volume 50 is the working volume for application 60. In other words, volume 50 stores the data that is actively being accessed by application 60. Other volumes (e.g., replicated volumes, not shown) can also store copies of the data in volume 50; however, these other volumes are not directly accessed by application 60, since volume 50 is the working volume. While application 60 is shown as part of computing node 20, it is noted that application 60 can also be implemented on other nodes (e.g., application 60 could be implemented on a client computing node that accesses volume 50 via a computing node 20).

In one embodiment, volume manager 40 and application 60 are implemented in software, executed by computing node 20. Volume manager 40 and application 60 can each alternatively be implemented in hardware. For example, computing node 20 can include a logic device (e.g., an Application Specific Integrated Circuit (ASIC), Programmable Logic Device (PLD), or the like) configured to perform the functions of application 60 and/or volume manager 40. Computing node 20 can also be implemented using hardware that is configured to perform some of the functions of application 60 and/or volume manager 40 and that are also configured to execute software implementing other functions of application 60 and/or volume manager 40.

Volume manager 40 controls access to volume 50. Volume 50 includes application data 70 and redundant data 80. Application data 70 includes the data that is accessed by application 60. Redundant data 80 includes data that can be used to recover application data 70 if application data 70 is corrupted. For example, redundant data 80 can be a mirrored copy of application data 70 (in the case of mirrored copies, each copy is considered to be redundant data with respect to the other copy). Accordingly, volume manager 40 may also access the redundant data to satisfy application read requests. Alternatively, redundant data 80 can be parity data associated with application data 70. For example, if volume 50 is a RAID 5 volume, redundant data 80 includes the parity data. Parity can also be used to recover application data 70 if application data 70 is corrupted.

Volume manager 40 also maintains state information 90 for volume 50. Volume manager 40 consolidates state information 90 (e.g., by storing the state information 90 within a bitmap or extent map) and associates the consolidated state information with volume 50. In the illustrated example, state information 90 is stored separately from volume 50. It is noted that state information 90 is included in volume 50 in alternative embodiments.

State information 90 identifies the state of each region of volume 50. Regions of volume 50 can be in bytes, blocks, or extents (i.e., ranges of data specified by a starting address and a length or by a starting address and an ending address). The size of each region can be constant or variable. The regions can be contiguous or non-contiguous on the underlying storage device.

State information 90 indicates whether each region of volume 50 has valid contents. A valid region is a region that contains valid application data. Application data is valid if application 60 has written or read a particular value of that application data. The values of valid regions should remain consistent with the values that application 60 expects those regions to store. For example, if application 60 has written a value to a region, application 60 should receive that value the next time application 60 reads from the region. In contrast, it is not necessary for invalid regions of application data to have any particular value.

If application data is valid, the redundant data associated with that application data needs to be synchronized with the application data so that the redundant data can be used to recover the application data, if necessary. If application data is invalid, however, the value of the application data is not critical to maintaining consistency. If application 60 has not written valid data to a particular region, the application 60 will not expect to read anything useful when the application reads from that region. Therefore, since the operation of application 60 will not be affected by changes in value of invalid regions, it is not necessary to keep the application data and redundant data synchronized for invalid regions of the volume. In other words, if the application data in an invalid region is modified, there is no need to use the redundant data to recover a particular value of the invalid region (i.e., there is no need to store consistent values in such regions).

Since it is not necessary to synchronize the redundant data with invalid application data, and since state information 90 indicates which regions of the volume are valid, there is no need to synchronize all of the redundant data in volume 50 when volume 50 is created. Avoiding the synchronization of invalid application data with redundant data can significantly reduce the amount of time and/or resources needed to create a volume. Often, applications only use a portion of a volume. For example, a file-system may only use half of a mirrored volume (e.g., only 500 GB of a 1 TB volume may be used). If it is not necessary to synchronize all of the redundant data, a significant amount of I/O activity is avoided (e.g., only reads and writes needed to synchronize 500 GB of the 1 TB volume needs to be performed).

In one embodiment, state information 90 is maintained as a bitmap that includes one bit per region of volume 50. The value of a particular bit within the bitmap identifies whether a respective region is valid (e.g., in one embodiment, if the bit is set, the respective region is valid; if the bit is cleared, the respective region is invalid). In other embodiments, more than one bit of state information is maintained per region of volume 50. For example, in one embodiment, two bits are maintained per region. One bit identifies whether the associated region is valid, while the other bit identifies whether the associated region has been modified subsequent to a particular point in time. It is noted that other types of state information can be maintained instead of and/or in addition to information regarding validity and/or modification. Similarly, state information 90 can be maintained in structures other than bitmaps. For example, in one embodiment, state information 90 indicates which regions of volume 50 are valid by listing each valid region of volume 50 (e.g., the listing can specify the starting Logical Block Address (LBA) of each valid region). In another embodiment, state information 90 indicates which regions of volume 50 are valid by listing each invalid region of volume 50 (such that all non-listed regions are considered to be valid). In yet another embodiment, the state information 90 indicates which extents (specified by either a starting and an ending offset or a starting offset and a length) of volume 50 are valid or invalid by listing the extents of volume 50 and then indicating whether each listed extent is valid.

Volume manager 40 updates state information 90 in response to accesses to volume 50. As the application data in particular regions of volume 50 is accessed, and as the redundant data associated with the application data in those regions is synchronized with the redundant data, volume manager 40 updates state information 90 to indicate that those regions contain valid application data.

Volume manager 40 also uses state information 90 to determine how to handle various read and write requests to volume 50. When read or write requests specifying valid regions of volume 50 are received from application 60, volume manager 40 performs the corresponding read or write operations to volume 50 normally (e.g., a read or write access to a valid region does not cause a change in state information 90, and redundant data 80 is only modified in response to write accesses to application data 70). Since the synchronization of redundant data with application data in invalid regions is delayed until the time the application data in an invalid region is first accessed, accesses to invalid regions of volume 50 are handled differently than accesses to valid regions. For example, if volume manager 40 receives a request to read a particular region of volume 50, and if state information 90 identifies that region as being invalid, volume manager 40 can synchronize the redundant data with the application data in the invalid region as part of and/or subsequent to performance of the read operation. After the read operation has been performed and the redundant data has been synchronized with the associated application data in the invalid region, volume manager 40 updates state information 90 to indicate that the region is valid. As another example, if application data 70 is corrupted and volume manager 40 uses redundant data 80 to recover application data 70, volume manager can selectively only recover the portions of application data 70 that are identified as being valid in state information 90. This can decrease the amount of time and/or resources needed to recover application data 70. More examples of how various accesses to invalid regions of a volume are handled are provided below.

Figure 2A:
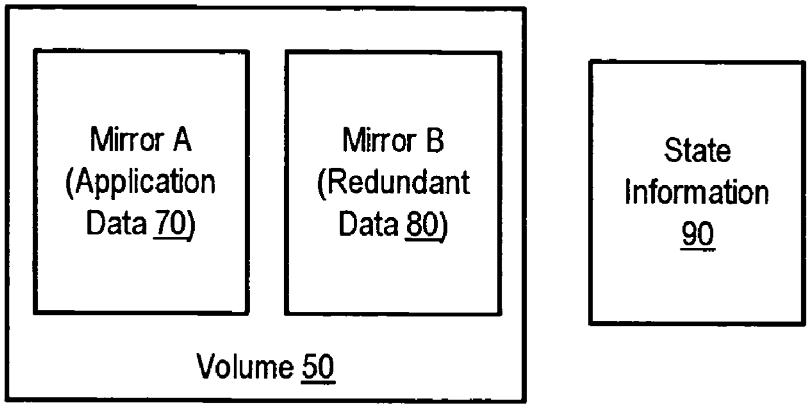
FIGS. 2A-2D show an example of how state information is maintained for regions of a mirrored volume, according to one embodiment of the present invention.

FIGS. 2A-2D show an example of a mirrored volume and the state information associated with that mirrored volume. As shown in FIG. 2A, volume 50 includes two mirrors: mirror A and mirror B. Each mirror stores application data while also providing redundant data for the other mirror. State information 90 associated with volume 50 identifies the state of each region of volume 50.

Figure 2B:
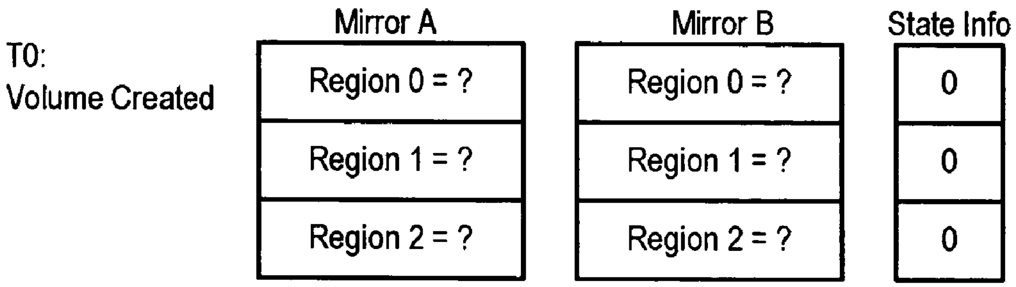

FIG. 2B illustrates the initial state of volume 50 at the time T0, which is the time at which volume 50 is created. To simplify this example, only three regions 0-2 of volume 50 are shown; however, a typical volume will include more than three regions. In this example, state information 90 includes one bit per region of volume 50. If a bit is set to a binary value of 1, the corresponding region of volume 50 is valid. If instead a bit is cleared (i.e., if the bit is set to a binary value of 0), the corresponding region of volume 50 is invalid. As shown, each region of volume 50 is initially identified as being invalid by state information 90. The value of each region is identified by a question mark, indicating that the value of each region is indeterminate.

Figure 2C:
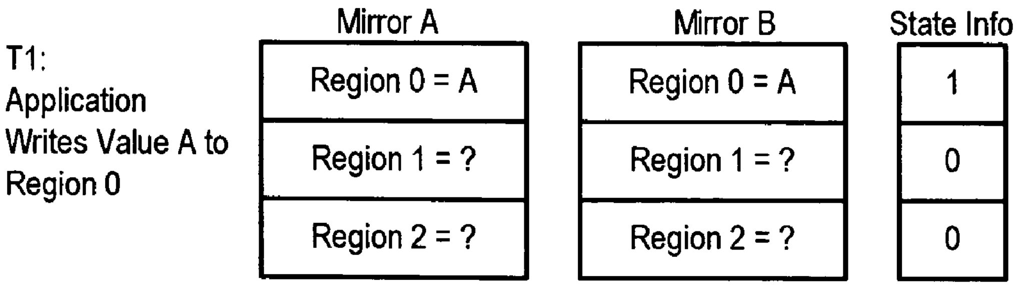

FIG. 2C illustrates volume 50 and state information 90 at time T1, when an application writes value "A" to region 0 of volume 50. The write operation to region 0 is performed to both mirrors of volume 50, and accordingly the value of region 0 of each mirror is shown as being "A". Since region 0 has been updated by the application, state information 90 is updated to indicate that region 0 is valid by updating the value of the bit associated with region 0 to have a binary value of 1.

While the illustrated example shows the situation in which the entire value of region 0 is updated (i.e., each bit within region 0 is written to), other situations occur in which less than all of region 0 is updated by a write. For example, if region 0 is eight bytes in size, an application can write to a single byte within region 0 (such a situation is referred to as a "partial write"). When a partial write occurs, the volume manager can read the unmodified portions of region 0 from one of the mirrors and write those values to the other mirror in order to synchronize the two mirrors. After the redundant data is synchronized with region 0, the volume manager updates the state information 90 to indicate that the region is valid.

Figure 2D:
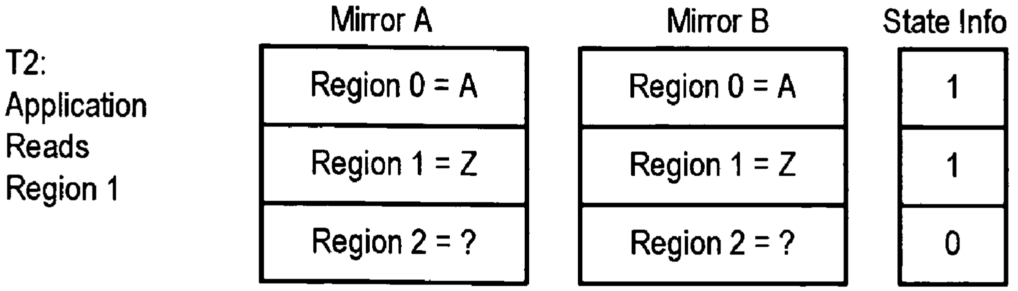

FIG. 2D shows volume 50 and state information 90 at time T2, when the application reads from region 1 of volume 50. In this example, the initial value "Z" of region 1 of one of the mirrors is read from the volume and returned to the application. To synchronize the two volumes, this value "Z" is then written to region 1 of the other mirror, such that the value of region 1 of both mirrors is Z. In response to the application accessing region 1, and in response to the redundant data being synchronized to the application data in region 1 (by synchronizing the values of region 1 of both mirrors), state information 90 is updated to indicate that region 1 is valid. If the read request only reads a portion of the region, the volume manager can read the value of the entire region from one mirror and write that value to the other mirror in order to synchronize the mirrors. When the accessed region of the mirrors is synchronized, the state information is updated to indicate that the region is valid. The value of the portion of the region that was specified in the read request is returned to the application after the state information is updated. In some embodiments, the accessed region may be temporarily locked for other accesses while the redundant information for the accessed region is being synchronized, and the read operation may not be completed until the state information for the region is updated. This assures consistency of read data in environments where multiple applications may issue simultaneous read requests for the same data.

Figure 3A:
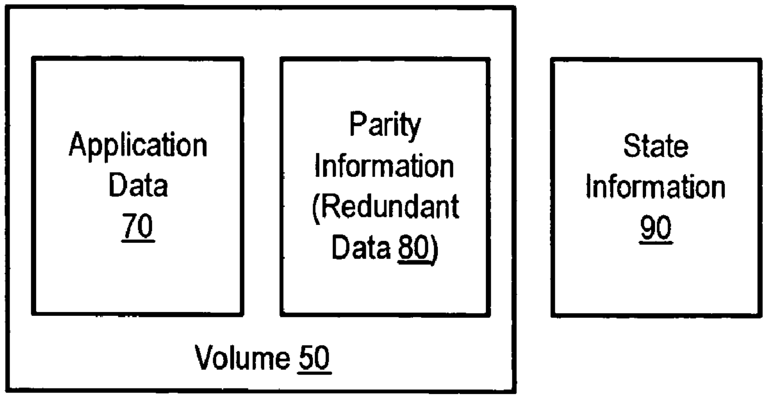
FIGS. 3A-3D show an example of how state information is maintained for regions of a RAID 5 volume, according to one embodiment of the present invention.

FIGS. 3A-3D show another example of a volume and the state information associated with that volume. In this example, volume 50 is implemented as a RAID 5 volume. As shown in FIG. 3A, volume 50 includes application data and parity information, which is redundant data that can be used to recover application data if some of the application data is corrupted or lost.

Figure 3B:
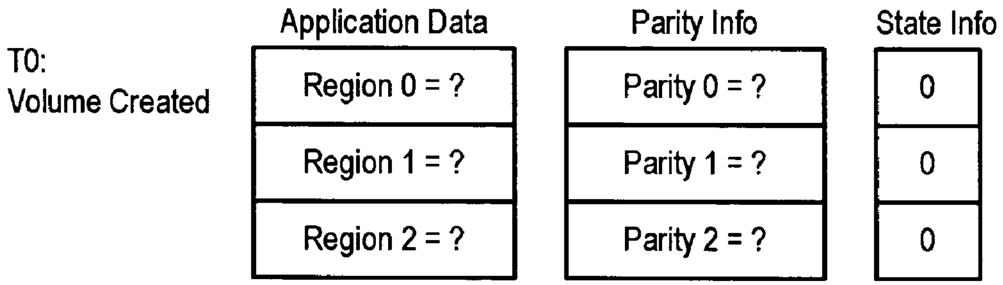
Figure 3C:
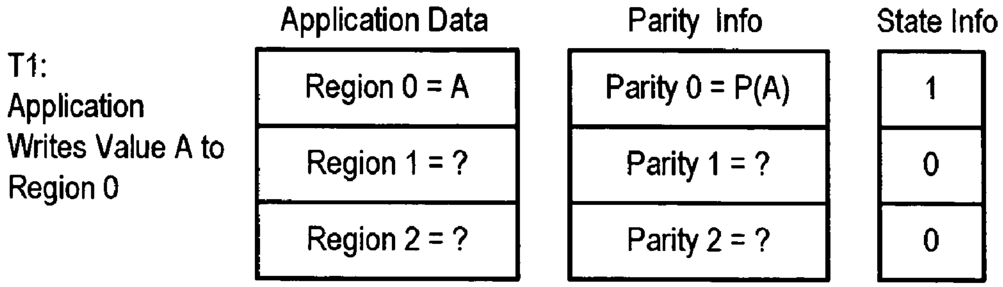
Figure 3D:
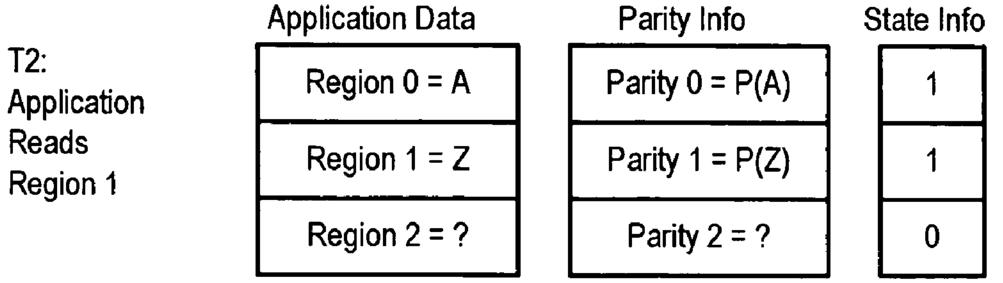

FIGS. 3B-3D illustrate several regions of the RAID 5 volume (for simplicity, only three regions are shown in this example; however, it is noted that a RAID 5 volume can include significantly more than three regions). Each region includes application data and parity information, and one bit of state information is maintained for each region (associated application data, parity information, and state information are shown in the same row of FIGS. 3B-3D). While the parity information is illustrated in a single column in FIGS. 3B-3D, it is noted that the parity information is actually interspersed with the application data throughout the RAID 5 volume.

FIG. 3B illustrates the RAID 5 volume at time T0, when the volume is created. At this time, the value of each region of the volume is indeterminate, and the state information identifies each region as being invalid. The parity information is not synchronized with the application data. In other words, the value of the parity information has not been calculated from the actual value of the corresponding application data, and thus the parity information cannot be used to detect errors in or correct the application data.

FIG. 3C illustrates the RAID 5 volume at time T1. At time T1, an application generates a write request to perform a complete write (also referred to as a full write) to region 0, in order to write value "A" to the application data in region 0 of the RAID 5 volume. As part of the write operation, the volume manager of the RAID 5 volume calculates the parity, P(A), of the new value "A" of region 0 and writes this value to the parity information associated with the application data in region 0. As a result, the redundant data is synchronized to the application data in region 0. The state information is updated to indicate that region 0 is valid.

If the write request to region 0 is not a complete write (i.e., if the write request updates less than the entire portion of the application data in region 1), the volume manager reads the original value of the unwritten portion of the application data in region 1 and uses that value, along with value "A", to calculate the parity of region 1. For example, assume "A" is one byte in length and is being written to the first byte of application data in region 1. If there are eight bytes of application data in region 1 and the eight bytes have initial values of "L", "M", "N", "O", "P", "Q", "R", and "S" respectively, the values of the eight bytes after the write are "A", "M", "N", "O", "P", "Q", "R", and "S" respectively. These values are then used to calculate the parity of region one.

FIG. 3D illustrates the RAID 5 volume at time T2, when an application generates a read request to region 1. In this example, the initial value of the application data in region 1 is "Z". When the application generates the read request to region 1, the value of region 1 is accessed and returned to the application. The value Z of region 1 is also used to calculate the parity P(Z) of region 1. The calculated parity value is written to the parity information associated with the application data in region 1. Since the parity information is now synchronized with the application data in region 1, the state information is updated to indicate that region 1 is valid. If the read request specifies only to a portion of the region, the entire region is read and the parity associated with that region is synchronized. The value of the portion of the region that is requested by the application is returned to the application after the state information is updated.

Figure 4A:
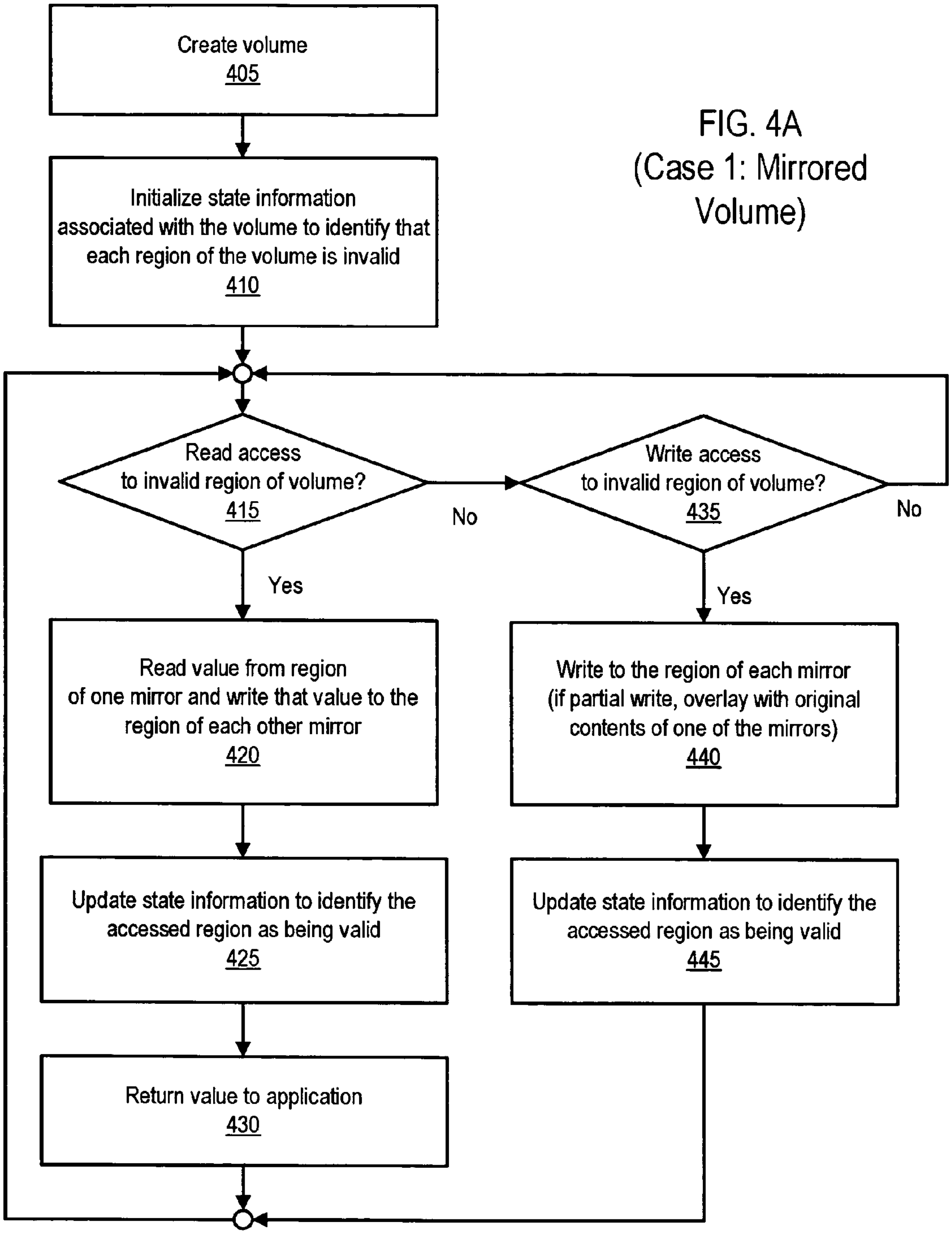
FIG. 4A is a flowchart of a method of tracking the valid regions of a mirrored volume, according to one embodiment of the present invention.

FIG. 4A is a flowchart of a method of tracking the valid regions of a mirrored volume. As noted above, a mirrored volume stores application data (in one of the mirrors) as well as redundant data (in another mirror) that can be used as a substitute for the application data if the application data is corrupted. At 405, the mirrored volume is created. Creation of the mirrored volume can involve allocating portions of one or more storage devices for use as the mirrored volume and mapping logical blocks of the mirrored volume to physical locations of the storage devices.

In this embodiment, this initial synchronization between the mirrors is not performed. Consistency problems that could otherwise arise due to not performing the initial synchronization are avoided by maintaining state information for the mirrored volume, as described below.

State information associated with the volume is initialized to indicate that each region of the volume is invalid, as shown at 410. Initializing the state information can involve writing a particular value to each bit within a bitmap. Each bit represents a different region of the volume, and the value of each bit indicates whether the represented region is valid or not. It is noted that function 410 can be performed at substantially the same time as function 405.

If a read access (e.g., performed as part of a read operation, initiated in response to a read request generated by an application) to an invalid region of the volume is detected, the value of the invalid region on one of the mirrors is read, as indicated at 415 and 420. In one embodiment, one of the mirrors is selected as a default mirror, and the default mirror is used to supply the values of invalid regions. In other embodiments, the mirror from which to read the value of the invalid region is selected dynamically for each read operation. For example, the mirror from which to read the value can be selected based on current access patterns to the volume in order to balance the I/O activity between mirrors, based on calculation of the disk drives' mechanical behaviors (e.g., read head positioning relative to the location of the region on the disk currently being read), based on the knowledge of caching characteristics of the storage devices where the volume is located, or simply based on random selection.

As shown at 420, the value that is read from the invalid region of one of the mirrors is returned to the application that initiated the read access. Additionally, this value of the accessed region is written to the same region of each of the other mirrors, effectively synchronizing the redundant data in this region of the volume with the application data in the region. It is noted that even if the read access is a partial read (i.e., if the read access accesses less than all of the data stored in the region), the entire value of the region is still read so that synchronization can be performed. In response to the redundant data in the region being synchronized with the application data, the state information is updated to indicate that the region is a valid region, as shown at 425. After the state information is updated, the value of the region (or of an appropriate portion of the region) is returned to the application that initiated the read access, as indicated at 430.

If a write access to an invalid region is detected (e.g., performed as part of a write operation, initiated in response to a write request generated by an application), as shown at 435, the invalid region is updated with the value supplied as part of the write access, as indicated at 440. If the write access is a partial write access that will write only a portion of the invalid region (e.g., if the region spans a block, but the write access is only updating one byte within the block), the original value of the region on one of the mirrors is read. This value is overlaid with the value being written. After the value being written is overlaid with the values read from one of the mirrors, the resulting value is written to the region on each of the other mirrors, such that the region has the same value on all of the mirrors. For example, if the region includes eight bytes, bytes 0-7, and the write access is updating byte 4, the value of bytes 0-7 (or simply the value of bytes 0-3 and 5-7) is read from a selected one of the mirrors. The values of bytes 0-3 and 5-7 that were read from the selected mirror are then written to corresponding bytes 0-3 and 5-7 of each other mirror, while the new value (supplied by the write access) of byte 4 is written to each of the other mirrors. The original value of the region on the selected mirror can be read before or after the write is performed to the selected mirror. As before, the mirror from which to read the original value of the region can be selected in a variety of different ways.

After the write access is performed to the invalid region, as shown at 440, the region has the same value on each of the mirrors and the regions are synchronized. In response to the write access, the state information is updated to indicate that the accessed region is valid, as shown at 445.

Figure 4B:
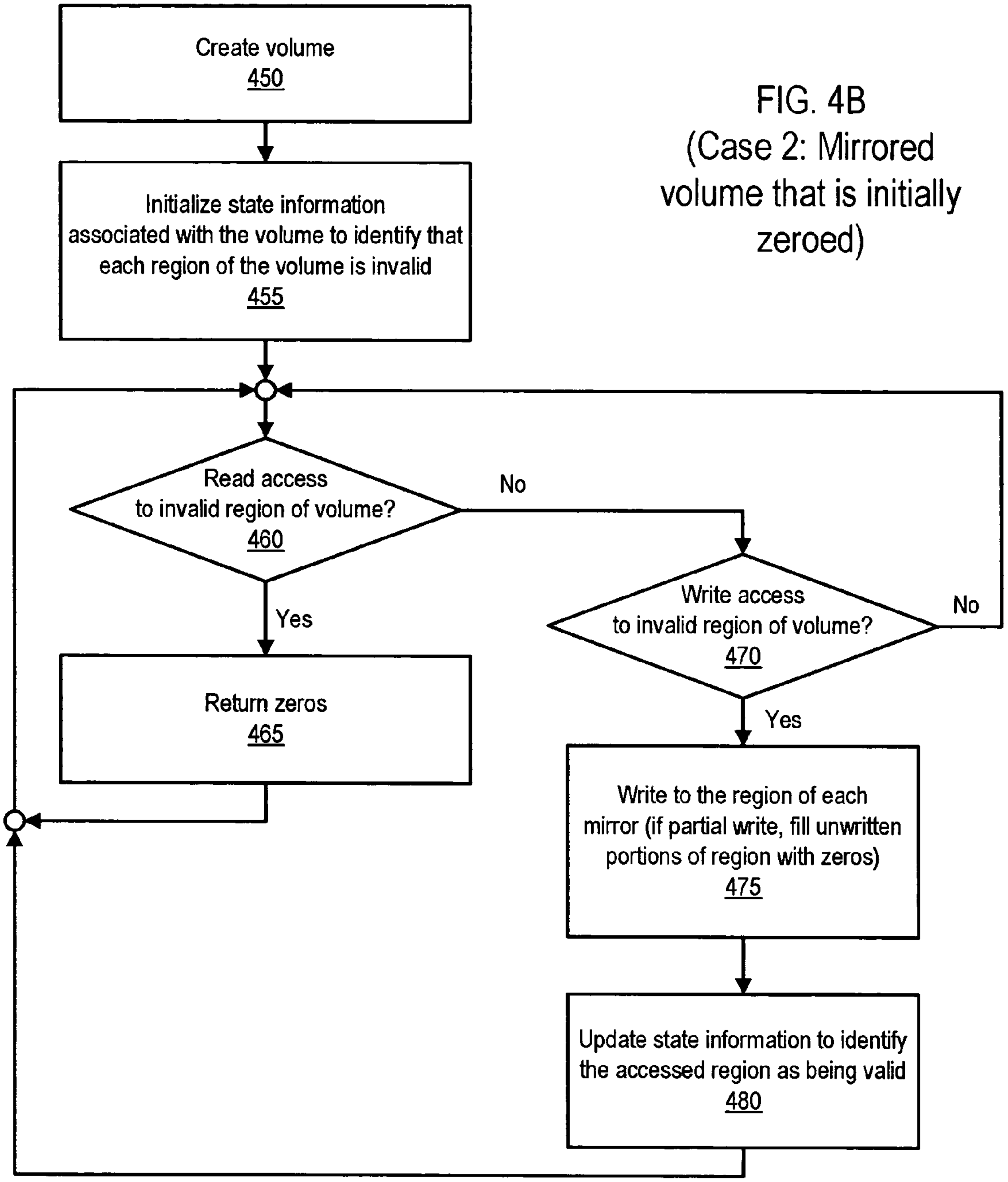
FIG. 4B is a flowchart of a method of tracking the valid regions of a mirrored volume, according to another embodiment of the present invention.

FIG. 4B is a flowchart of another method of tracking the valid regions of a mirrored volume. In this example, the volume manager controls accesses to the volume such that each bit in the volume is initialized to a binary value of zero.

At 450, the volume is created. Normally, creation of the volume may involve writing a value of zero to each bit within the volume. In such a case, the volume would not be accessible until each bit had been written. However, in this example, the process of writing a value of zero to each bit within the volume is not performed when the volume is created. Instead, writing zero to a particular region of the volume is delayed until the first read or write request specifying that region is received from the application.

At 455, state information associated with the volume is initialized to a value that identifies each region of the volume as being invalid. As noted above, initializing the state information can involve setting each bit within a bitmap to a particular value (e.g., binary 0). Function 455 is performed at substantially the same time as function 450, in some embodiments.

In the illustrated embodiment, if a read access is addressed to an invalid region of the volume, as detected at 460, zeros are returned to the application that initiated the read access. For example, if the application reads a byte of an invalid region, the application will receive "00000000". Thus, even though the volume has not been initialized to zeros by writing a zero to each bit of the volume, an application will nevertheless receive the appropriate values when accessing the volume. While all zeros are returned to the application in this example, other embodiments return other values to the application when the application reads an invalid region. In general, a default value of the invalid region (or portion of the invalid region) being read is returned to the application. As shown in the example of FIG. 4B, the default value can be zero. In other embodiments the default data returned from reading an invalid region can include other values. For example, at the byte level, values such as 0xFF in hexadecimal ("hex") or 11111111 in binary can be used as default values. At the word level, default hex values can include values that are selected to be visually recognizable as invalid (e.g., 0xCAFEBABE, 0xDEADBEEF, or 0xFEFEFEFE). In one embodiment, the application can select and/or set the default value of invalid regions.

In the embodiment illustrated in FIG. 4B, the invalid region accessed by the read is not validated in response to the read. Accordingly, in this embodiment, when the application reads an invalid region, no access is actually performed to that region of the volume. Instead, the volume manager generates the appropriate value to return to the application, in response to the state information indicating that the region is invalid. The state information is not updated in response to completion of the read access.

In alternative embodiments, the region accessed by the read is updated in response to the read. For example, in one such embodiment, when an application reads from an invalid region of the volume, the volume manager detects that the region is invalid (based on the state information) and generates the appropriate value to return to the application, without first accessing the region of the volume. In one embodiment the volume manager then writes a zero to each bit within the region (on each mirror) that is addressed by the read access. This write is performed before completion of the read access. After the value of the region has been updated on each of the mirrors, such that the region is synchronized on each of the mirrors, the volume manager updates the state information to indicate that the region is valid region. Once the state information is updated, the volume manager returns the appropriate value to the application that initiated the read access. It is noted that, although zeros are written to the region in this example, other embodiments can write other default values to the region.

Returning to FIG. 4B, if a write access is addressed to an invalid region of the volume, as detected at 470, the write access is performed to the region of each mirror, as shown at 475. If the write access is a partial write (e.g., if the write access updates less than all of the region), the remaining portions of the region are filled with zeros. After performance of the write access, each mirror has the same value of the region, and thus the redundant data is synchronized with the application data in the region. The state information is then updated to indicate that the region is valid, as shown at 480.

Figure 5A:
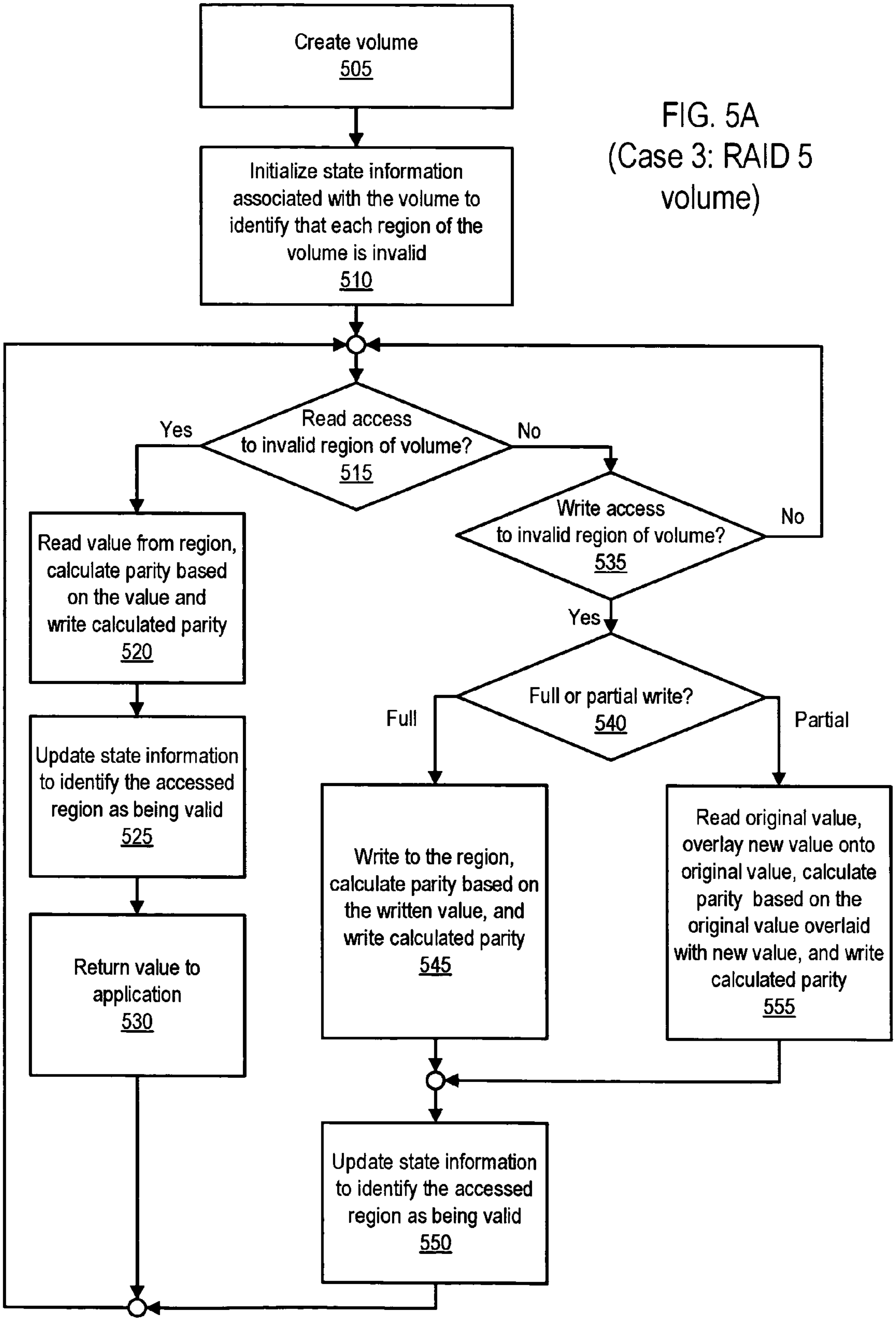
FIG. 5A is a flowchart of a method of tracking the valid regions of a RAID 5 volume, according to one embodiment of the present invention.

FIG. 5A is a flowchart of a method of tracking the valid regions of a RAID 5 volume (it is noted that a similar method can be used to track the valid regions of other types of RAID volumes). At 505, a RAID 5 volume is created. In this embodiment, the RAID 5 volume is not synchronized (e.g., by reading the initial value of application data in each region of the volume, calculating the parity for each region, and then writing the calculated parity back to the volume) when the RAID 5 volume is created.

In this example, each region corresponds to one stripe of the RAID 5 volume (a stripe is the unit of data for which parity is calculated). Thus, whenever a region is written, one parity calculation is performed. It is noted that in other embodiments, a region can include only a portion of a stripe or all or part of multiple stripes. The number of parity calculations performed for a given region will depend on the number of stripes included in the region. Is a region includes only a portion of a stripe, one or more other regions may need to be accessed to perform a parity calculation for that region. It is also noted that in other embodiments, several sets of redundant data can be maintained for the volume (e.g., in RAID 6 implementations or implementations that maintain more than one parity column), and the number of parity calculations performed for a given region will depend on the number of sets of redundant data and the specifics of the redundancy techniques that are used for the volume.

At 510, state information associated with the volume is initialized to a value that indicates that each region of the volume is currently invalid. As noted above, the state information is initialized at the substantially the same time as the creation of the volume in some embodiments.

If a read access to an invalid region of the volume is detected, as indicated at 515, the value of the region is read (at 520) from the volume. The value of the entire region is used to calculate the parity for the region. The calculated parity is then written to the volume, effectively synchronizing the application data in the region with the associated redundant data. After the parity is written to the volume, the state information is updated to indicate that the region is valid, as shown at 525. Then, at 530, the requested data is returned to the application that generated the read request.

If a write access to an invalid region of the volume is detected, as detected at 535, the write access is performed to the region and the parity associated with the application data in the region is updated based on the value that is written. If the write is a full write (i.e., if the write access updates all of the application data within the region), the parity is calculated without needing to read any values from the volume, as shown at 540-545. In other words, the parity is calculated from the data values being written. The parity is then written to the volume. The state information is then updated to indicate that the region is valid, at 550.

If the write is a partial write (i.e., if the write access updates less than all of the application data in the region), the original value of the region (or of the portions of the region that are not affected by the write access) is read from the volume, as shown at 540 and 555. The new value being written to the region is overlaid on the original value, and the resulting value is used to calculate the parity of the region. The calculated parity is then written to the volume. Once the parity has been updated based on the write access, the state information is updated to indicate that the region is valid, as shown at 550.

Figure 5B:
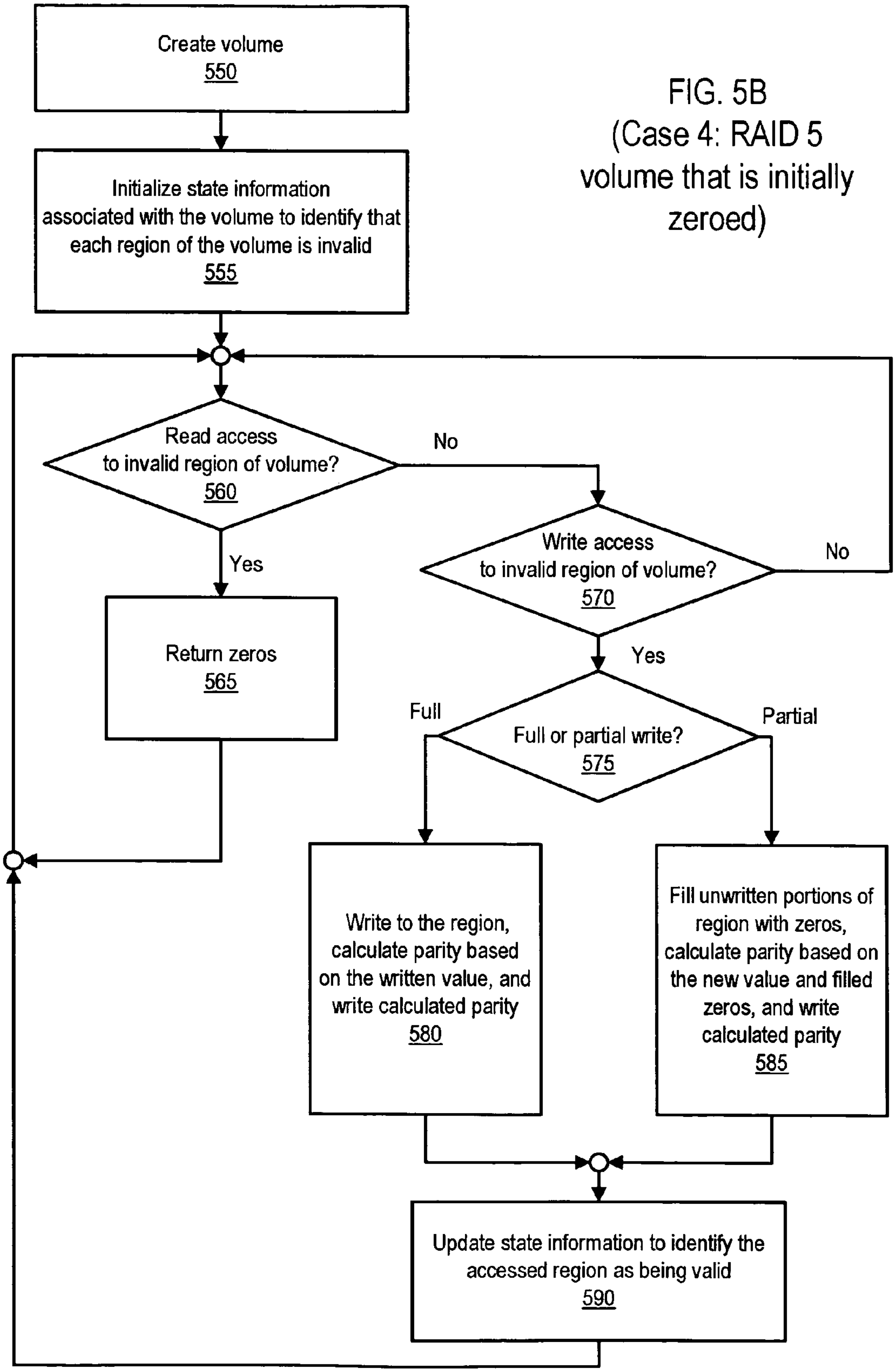
FIG. 5B is a flowchart of a method of tracking the valid regions of a RAID 5 volume, according to another embodiment of the present invention.

FIG. 5B is a flowchart of another method of tracking the valid regions of a RAID 5 volume (it is noted that a similar method can be used to track the valid regions of other types of RAID volumes, as described above). At 550, the RAID 5 volume is created. In this example, the volume manager controls access to the volume such that each bit of the volume has an initial value of zero, as described below. However, the write activity to write a value of zero to each bit of the volume is not performed when the RAID 5 volume is created. Instead, synchronization of the parity with the application data in a particular region is delayed until the first time that the particular region is accessed. At 555, state information associated with the RAID 5 volume is initialized to a value, which identifies each region of the RAID 5 volume as being invalid (function 555 is performed at the same time as function 550 in some embodiments).

If a read access to an invalid region of the volume is detected at 560, zeros are returned to the application that initiated the read access, as indicated at 565. The read access can complete without actually accessing the volume. In the illustrated embodiment, performance of the read access does not cause the region to be validated. However, in alternative embodiments, in response to (or as part of) the read access, zeros are written to the region, appropriate parity values (e.g., all zeros or all ones, depending on the type (e.g., even or odd) of parity selected and number of columns used to calculate parity) are generated and written to the volume, and the state information is updated to indicate that the region is valid. After the state information is updated, the zeros are returned to the application.

If a write access to an invalid region of the volume is detected at 570, the write access is performed to the volume, the parity for the region is updated based on the value being written, and the state information for the region is updated to indicate that the region is valid. In particular, if the write access is a full write (i.e., if the write access updates all of the application data within the region), the parity is calculated from the value being written, and the calculated parity is then written to the volume, as shown at 575 and 580. There is no need to read the original value of the region in order to perform the parity calculation. After the parity is written to the volume, the state information is updated to indicate that the region is valid, as indicated at 590.

If the write access is a partial write (i.e., if the write access updates less than all of the application data within the region), the portions of the region that are not updated by the write access are filled with zeros, as shown at 575 and 585. Similarly, the parity of the region is calculated based on the new value and the filled-in zeros. It is noted that the original value of the region does not need to be read from the volume in order to perform the parity calculation, since it is known that the portions of the region that are not updated by the write access will be filled with zeros. The calculated parity is written to the volume, and the state information is updated to indicate that the region is a valid region, as indicated at 590. In some embodiments, a default value other than zeros can be used to initialize the volume.

It is noted that the processes performed in FIGS. 4A-4B and 5A-5B can be performed at the same time that a newly created volume is being initialized (e.g., by a process that reads each region of the volume). The initialization process can be considered as simply another user process, which initializes the volume by reading every region, and thus the initialization process will cause the read/write-back behavior explained above in FIGS. 4A-4B and 5A-5B. Accordingly, the initialization process can happen simultaneously with and overlap with regular application I/O to the volume.

In each of FIGS. 4A-4B and 5A-5B, the state information associated with a volume is initialized. It is noted that the initialization of the state information can be delayed using the same techniques used to delay the initialization of the volume. For example, in some embodiments, the totality of state information for all regions of a volume is collected into a summary data structure. In such embodiments, the initialization of the individual regions' state information is handled on an as-needed basis, using the same techniques described above. For example, another second set of state information, which indicates which regions of the first set of state information (which indicates valid regions of the volume) are valid, can be maintained. Accesses to the first set of state information can be handled in the same manner that accesses to the volume are handled, as shown above in FIGS. 4A-4B. It is noted that these sets of state information may not include redundant data, and thus no synchronization may be needed. In such embodiments, each time an invalid region of the first set of state information is accessed, the corresponding portion of the second set of state information is updated to indicate that the accessed region of the first set of state information is now valid (without the need to synchronize redundant data). In some embodiments (e.g., embodiments having extremely large volumes), more than two sets of hierarchical state information can be maintained. The set of state information at the top of the hierarchy can be initialized using a single fast I/O operation, and the initialization of the successive sets of state information can be delayed using the techniques described above.

It is also noted that the state information can be initialized by other applications, in addition to and/or instead of a volume manager. For example, the state information can be initialized by a file system that is using the volume. The state information indicates that a particular region is valid if the application has stored valid data within that particular region.

Figure 6:
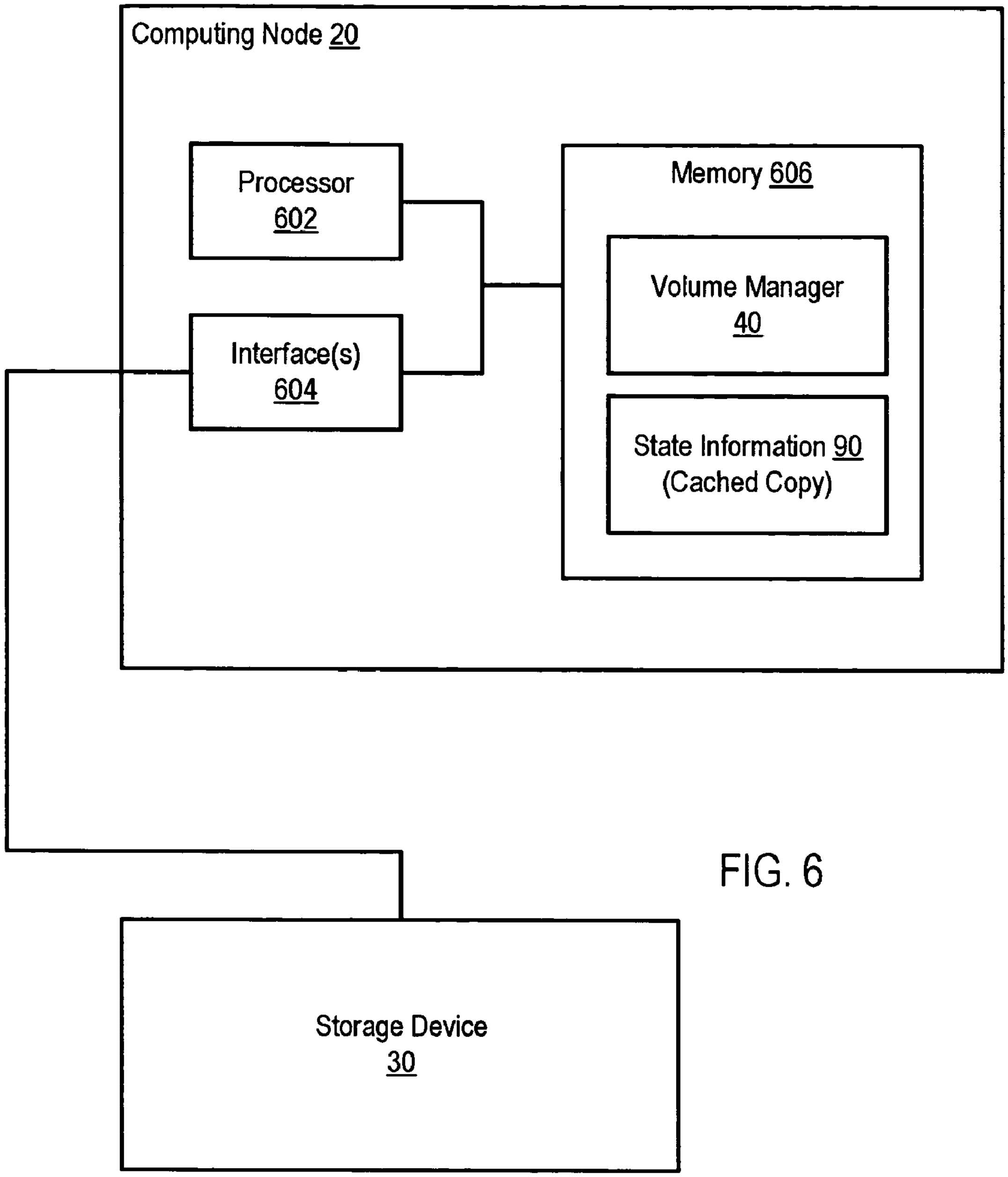
FIG. 6 is a block diagram of a computing node, according to one embodiment of the present invention.

FIG. 6 is a block diagram of computing node 20. Computing node 20 includes one or more processors 602, one or more interfaces 604, and memory 606. Processor 602 executes program instructions stored in memory 606. Interface 604 provides access to storage device 30. Additional interfaces (not shown) can also provide access to various other peripheral devices and/or networks.

Memory 606 stores program instructions executable to implement volume manager 40. Volume manager 40 is configured to present one or more virtualized volumes and to maintain state information for each volume. Volume manager 40 uses the state information as described above (e.g., using all or some of the methods described in reference to FIGS. 4A, 4B, 5A, and 5B).

Memory 606 also provides a temporary storage space for all or part of state information 90. For example, volume manager 40 can cache recently-accessed portions of state information 90 within memory 606 (a copy of state information 90 is also maintained on a persistent storage device such as storage device 30).

As shown in FIG. 6, program instructions and data implementing volume manager 40 can be stored on various computer readable storage media such as memory 606. In some embodiments, such software is stored on a computer readable storage medium such as a CD (Compact Disc), DVD (Digital Versatile Disc), hard disk, optical disk, tape device, floppy disk, and the like). In order be executed by processor 602, the instructions and data implementing volume manager 40 are loaded into memory 606 from the other computer readable storage medium. Such instructions and/or data can also be transferred to computing node 20 for storage in memory 606 via a network such as the Internet or upon a carrier medium such as a network and/or a wireless link upon which signals such as electrical, electromagnetic, or digital signals, on which the data and/or instructions implementing volume manager 40 are encoded, are conveyed.

Although the present invention has been described with respect to specific embodiments thereof, various changes and modifications may be suggested to one skilled in the art. It is intended that such changes and modifications fall within the scope of the appended claims.

What is claimed is:

1. A method comprising:

maintaining state information, wherein the state information is associated with a plurality of regions of a working volume, wherein the state information indicates which of the regions of the working volume are valid, wherein the maintaining the state information comprises updating the state information in response to the working volume being accessed, and wherein the updating the state information comprises writing to a storage device that stores the state information;

delaying synchronization of data stored in a first region of the plurality of regions with associated redundant data, in response to the state information indicating that the first region is invalid, wherein the synchronization is delayed until the first region is accessed;

receiving a read request for application data within a one of the regions, wherein prior to the receiving, the state information indicates that the one of the regions is invalid; and writing redundant data to the working volume, in response to the read request, wherein the redundant data corresponds to the application data in the one of the regions, and wherein the updating the state information comprises updating the state information to indicate that the one of the regions is valid, in response to the writing the redundant data.

2. The method of claim 1, further comprising:

initializing the state information to a value, wherein the value indicates whether each region of the working volume is valid.

3. The method of claim 2, wherein the initializing is performed by an application, and the value indicates that a region of the working volume is valid if the application has valid data in the region.

4. The method of claim 2, further comprising:

maintaining a second set of state information, wherein the second set of state information indicates which regions of the state information are valid.

5. The method of claim 2, wherein the initializing is performed in response to the working volume being created, and the value indicates that each region of the working volume is invalid.

6. The method of claim 5, wherein application data stored in a particular region is not synchronized with redundant data associated with the application data, while the state information indicates that the particular region is invalid.

7. The method of claim 1, further comprising:

receiving a write request to application data within a one of the regions, wherein prior to the receiving, the state information indicates that the one of the regions is invalid; and writing redundant data to the working volume, in response to the write request, wherein the redundant data corresponds to the application data in the one of the regions, and the updating the state information comprises updating the state information to indicate that the one of the regions is valid, in response to the writing the redundant data.

8. The method of claim 1, further comprising:

returning a default data value, in response to a read request to application data in a one of the regions, wherein the state information indicates that the one of the regions is invalid.

9. The method of claim 8, wherein each bit of the default data value has a value of zero.

10. The method of claim 8, further comprising:

an application setting the default value.

11. The method of claim 1, wherein the working volume comprises a first mirror and a second mirror.

12. The method of claim 1, wherein the working volume is a RAID volume.

13. The method of claim 12, further comprising:

writing a parity value to the working volume, in response to a partial write access to a one of the regions, wherein if, prior to the partial write access, the state information indicates that the one of the regions is invalid, the parity value is calculated without reading an old value of the one of the regions.

14. A system comprising:

one or more storage devices, wherein the one or more storage devices implement a working volume;

state information associated with the working volume, wherein the state information indicates which regions of the working volume are valid, and wherein prior to reception of a read request for application data within a one of the regions, the state information indicates that the one of the regions of the working volume is invalid; and a volume manager, wherein the volume manager is configured to delay synchronizing data stored in a first region of the working volume with associated redundant data, if the state information indicates that the first region is invalid, wherein the synchronization is delayed until the first region is accessed, and wherein the volume manager is configured to:

receive the read request to the application data within the one of the regions, write redundant data to the working volume, in response to the read request, wherein the redundant data corresponds to the application data in the one of the regions, and update the state information to indicate that the one of the regions is valid, in response to writing the redundant data.

15. The system of claim 14, wherein the volume manager is configured to initialize the state information to a value indicating that each region of the volume is invalid, in response to the working volume being created.

16. The system of claim 14, wherein a one of the regions of the working volume comprises application data, redundant data associated with the application data is synchronized with the application data in the one of the regions, if the state information indicates that the one of the regions is valid, and the redundant data is not synchronized with the application data in the one of the regions, if the state information indicates that the one of the regions is invalid.

17. The system of claim 14, wherein prior to reception of a write request to application data within a one of the regions, the state information indicates that the one of the regions of the working volume is invalid, and the volume manager is configured to:

receive the write request to the application data within the one of the regions, write redundant data to the working volume, in response to the write request, wherein the redundant data corresponds to the application data in the one of the regions, and update the state information to indicate that the one of the regions is valid, in response to the writing the redundant data.

18. A computer readable storage medium comprising program instructions executable to:

maintain state information, wherein the state information is associated with a plurality of regions of a working volume, wherein the state information indicates which of the regions of the working volume are valid, and wherein maintaining the state information comprises updating the state information in response to the working volume being accessed;

delay synchronization of data stored in a first region of the plurality of regions with associated redundant data, in response to the state information indicating that the first region is invalid, wherein the synchronization is delayed until the first region is accessed;

receive a read request for application data within a one of the regions, wherein prior to reception of the read request the state information indicates that the one of the regions is invalid; and write redundant data to the working volume, in response to the read request to the one of the regions, wherein the redundant data corresponds to the application data in the one of the regions, and wherein updating the state information comprises updating the state information to indicate that the one of the regions is valid, in response to writing the redundant data.

19. The computer readable storage medium of claim 18, wherein the program instructions are further executable to:

receive a write request to application data within a one of the regions, wherein prior to reception of the write request, the state information indicates that the one of the regions is invalid; and write redundant data to the working volume, in response to the write request to the one of the regions, wherein the redundant data corresponds to the application data in the one of the regions, and updating the state information comprises updating the state information to indicate that the one of the regions is valid, in response to the writing the redundant data.

20. The computer readable storage medium of claim 18, wherein the program instructions are further executable to:

return a default data value, in response to a read request to a one of the regions, wherein the state information indicates that the one of the regions is invalid.

21. A system comprising:

a storage medium for storing state information;

means for initializing the state information; and means for maintaining the state information, wherein the state information is associated with a plurality of regions of a working volume, wherein the state information indicates which of the regions of the working volume are valid, subsequent to being initialized, and wherein maintaining the state information comprises updating the state information in response to the working volume being accessed;

means for delaying synchronization of data stored in a first region of the plurality of regions with associated redundant data, in response to the state information indicating that the first region is an invalid region, wherein the synchronization is delayed until the first region is accessed;

means for receiving a read request for application data within a one of the regions, wherein prior to reception of the read request the state information indicates that the one of the regions is invalid; and means for writing redundant data to the working volume, in response to the read request to the one of the regions, wherein the redundant data corresponds to the application data in the one of the regions, and wherein updating the state information comprises updating the state information to indicate that the one of the regions is valid, in response to writing the redundant data.

22. The system of claim 21, further comprising:

means for receiving a write request to application data within a one of the regions, wherein prior to write request, the state information indicates that the one of the regions is invalid; and means for writing redundant data to the working volume, in response to the write one of the regions, wherein the redundant request to the data corresponds to the application data in the one of the regions, and updating the state information comprises updating the state information to indicate that the one of the regions is valid, in response to the writing the redundant data.

23. The system of claim 21, further comprising:

means for returning a default data value, in response to a read request to a one of the regions, wherein the state information indicates that the one of the regions is invalid.

* * * * *